Patented May 1, 1951

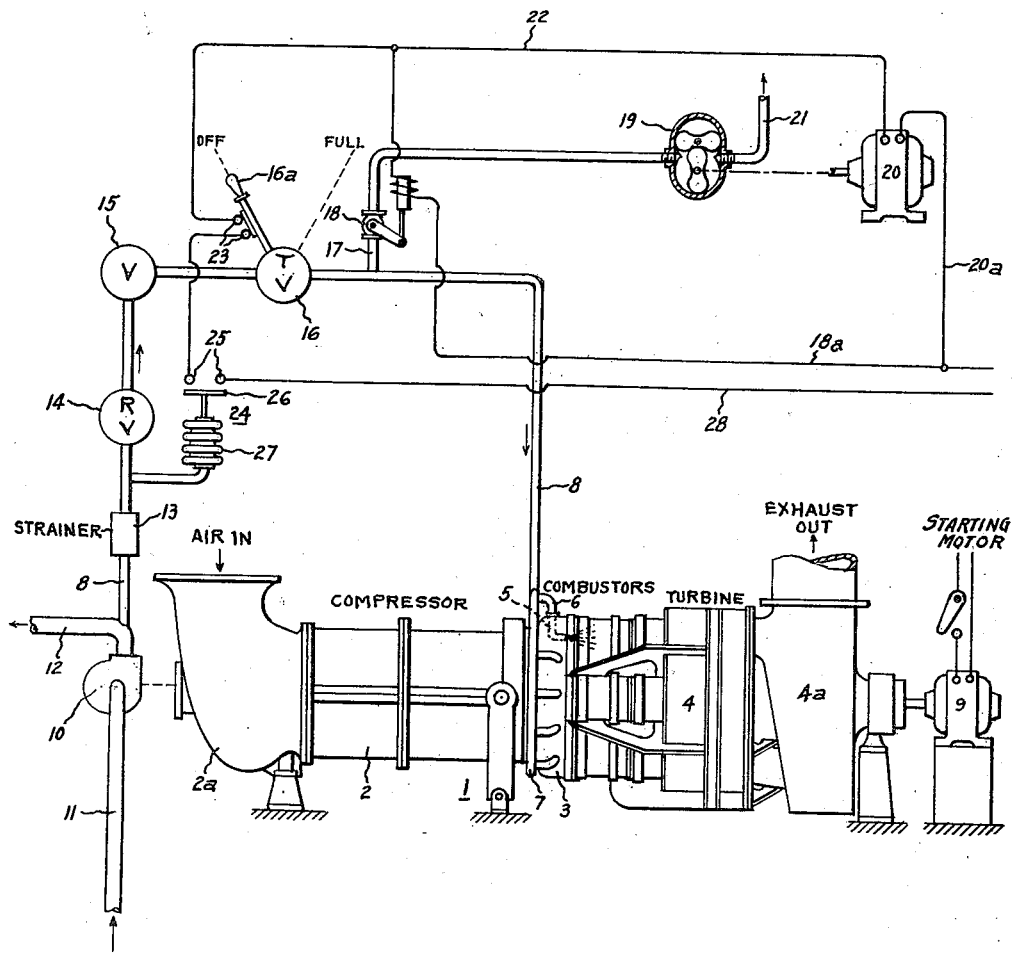

2,551,241

UNITED STATES PATENT OFFICE 2,551,241

PURGING ARRANGEMENT FOR GAS TURBINE FUEL SYSTEMS

Bruce O. Buckland, Schenectady, N. Y., assignor to General Electric Company, a corporation of New York Application December 9, 1949, Serial No. 132,095

4 Claims. (Cl. 60—44)

This invention relates to fluid fuel supply systems for thermal powerplants, particularly to a gas turbine fuel system with special means for removing any unburned fuel which may accumulate in the fuel or combustion system during periods when the powerplant is shut down but fluid fuel under pressure is available to the system.

In the operation of gas turbine powerplants it has been found necessary to provide means for insuring that unburned fuel does not accumulate in the fuel or combustion system when the powerplant is shut down. If such accumulation should occur, then the next time the powerplant is started there may be an initial burst of excessively high temperature gases supplied to the turbine for a period of several seconds. As is well known to those familiar with the art, the turbine buckets are perhaps the most critical structural component because of the extremely high centrifugal forces and elevated temperatures to which they are subjected. In order to obtain optimum cycle efficiency, it is desirable to operate the turbine buckets at temperatures so high that an increase in their mean operating temperature of even 50° to 100° F. results in a serious deterioration of bucket life. "Hot starts" resulting from the above-described accumulation of fuel during shut-down have been found to be a serious source of reduced bucket life. Furthermore, the accumulation of unburned fuel may under certain conditions result in the formation of an explosive gaseous mixture in the combustion chambers or other parts of the powerplant, so that when an attempt is made to start the powerplant a violent explosion may result. It is of course essential to insure that there are no such explosive mixtures present when it becomes necessary to disassemble the powerplant for inspection and servicing.

Some sort of purging system for eliminating unburned fuel during periods of shut-down is particularly necessary in those cases where the powerplant is employed as a prime mover in pumping stations for natural gas pipe-lines, in which case a small portion of the gas being pumped is extracted to serve as fuel for the powerplant. In such cases, there is of course provided some sort of a shut-off valve between the gas main and the powerplant. When the powerplant is inactive, this shut-off valve is closed, but the supply pressure in the pipe-line is maintained, with the result that any leakage through the shut-off valve may result in a dangerous accumulation of fuel-air mixture in the powerplant. The present invention was specifically intended for use in connection with such a gas turbine powerplant burning natural gas; but it is to be understood that the invention is also applicable to powerplants using liquid fuels such as gasoline, kerosene, or other heavier oils such as Diesel fuel or commercial "bunker C."

Accordingly, an object of the present invention is to provide a purging system for positively eliminating from a fluid fuel system for a powerplant of the type described any unburned fuel mixture which may be present in the fuel system or combustors when the powerplant is inoperative.

Other objects and advantages will be apparent from the following description taken in connection with the accompanying drawing, in which the single figure represents diagrammatically a gas turbine powerplant with a fuel system having purging means in accordance with the invention.

Referring now more particularly to the drawing, the powerplant is shown generally at 1 as including a multi-stage axial flow compressor 2 having an inlet casing 2a open to the ambient atmosphere at one end and discharging into a plurality of circumferentially spaced combustors 3, which in turn supply hot motive fluid to a turbine 4. The exhaust is discharged to atmosphere through a suitable casing 4a. Each of the combustors 3 is provided with a separate fuel spray nozzle, one of which is shown in dotted lines at 5. This nozzle may be of any suitable type; and the specific form of nozzle used will of course vary depending on the character of the fuel burned. The details of the nozzles used are not material to an understanding of the present invention. The respective nozzles 5 are connected by means of branch conduits 6 to an annular main or header 7 to which fuel is supplied by a conduit 8.

The structural details of the powerplant are not material to the present invention, but it may be noted that the powerplant shown is of the type disclosed in the application of Alan Howard, C. S. Rice, and B. O. Buckland, Serial No. 754,002, filed June 11, 1947 and assigned to the same assignee at the present application.

For starting the powerplant, any suitable type of starting motor is arranged to be connected to the turbine-compressor rotor of the gas turbine. In the drawing, this is indicated diagrammatically as being a conventional electrical motor 9, which is of course supplied with electrical energy from a suitable source and is provided with switch means for energizing the motor only when the powerplant is to be started. For purpose of illustration, it may be considered that the component 9 is an electric motor-generator which delivers the useful output of the powerplant in the form of electrical energy in normal operation, and to which electrical energy is supplied during the starting cycle so that the unit also serves as a starting motor.

If the powerplant is used as a pipe-line pumping unit, the turbine-rotor shaft will of course be coupled by means not shown to another suitable pump or compressor unit. Such a pump may be considered to be represented diagrammatically by the pump shown at 10 in the drawing. While the pump is illustrated as being of the simple "single-stage centrifugal type," it will be appreciated that for pipe-line pumping a high efficiency multi-stage axial flow or centrifugal compressor would be used. A smaller, simpler positive displacement pump will be used where it serves only to supply gaseous or liquid fuel to the powerplant. The pump or compressor 10 receives the fluid being pumped through an inlet conduit 11 and discharges into a conduit 12. It will be understood that, if the conduits 11, 12 are considered to represent a pipe-line conveying large quantities of fuel gas, then there will be other pump means in series with the pump 10, disposed at intervals along the pipe-line. This of course means that the fluid pressure in the conduit 11, 12 will be maintained by the other pumps even if the powerplant 1 should be shut down for inspection or overhaul.

The fluid required as fuel for the powerplant 1 is withdrawn from the main conduit 12 through the supply line 8. This conduit incorporates a suitable strainer shown at 13, which serves to prevent foreign particles such as scale or other dirt from the pipe-line from entering the gas turbine fuel system. The pressure of the fluid fuel supplied to the powerplant is held substantially constant by a suitable pressure regulating valve 14. Downstream from the valve 14 is a shut-off valve 15. The speed and power output of the powerplant is controlled by a suitable throttle valve shown at 16. For purpose of illustration, valve 16 is represented as having a manual operating handle 16a with an "off" position and a "full load" position. This handle is of course in the off position whenever the powerplant is completely shut down.

If the plant is to be inactive for any length of time, the auxiliary shut-off valve 15 is also closed. However, no matter how carefully the valves 15, 16 are chosen and maintained, there is always some possibility that a certain amount of leakage will pass these valves into the gas turbine supply main 7. If this happens, it may mean that a dangerously explosive mixture may form in the gas turbine combustors 3 or in the turbine or exhaust casings. These components represent a sufficient volume that, if an explosion should occur, the powerplant might well be completely demolished. Therefore, for the protection of the machine and the personnel in the neighborhood, it is essential that some sort of purging arrangement be provided for preventing the accumulation of an explosive mixture in the fuel and combustion system.

The special purging arrangement shown in the drawing comprises a bleed conduit 17 connected to the fuel supply conduit 8 immediately downstream from the shut-off and metering valves 15, 16. Conduit 17 is provided with an automatically actuated valve, illustrated as being a conventional solenoid valve 18 energized by the electrical circuit described hereinafter. The conduit 17 communicates with the inlet side of a suitable positive displacement pump, represented as being of the well-known "Roots type." This scavenging or purging blower 19 is driven by any suitable means such as the electric motor 20, and discharges through a conduit 21, which may lead to the roof of the building in which the powerplant is housed or any other suitable location where the potentially explosive vapors from the powerplant may be safely discharged.

It will be apparent from a consideration of the arrangement that the purpose of the purging system needs to operate only when fluid under pressure is available in the conduit 12 and when the powerplant is in the shut-down condition. To effect operation of the purging blower 19 only as needed, the electric motor 20 and solenoid valve 18 are energized from a common electrical system including a suitable source, one pole of which is connected by wires 20a, 18a to a terminal of the motor 20 and solenoid 18. The other terminals of the solenoid valve and motor are connected by wires 22 to switch means associated with the manually actuated throttle valve handle 16a. This switch may be of any suitable type, but is represented diagrammatically as consisting of two stationary contacts 23 adapted to be bridged by an electrically conductive member carried by the lever 16a. In series with the switch 23 is a pressure responsive switch indicated generally at 24 and including a pair of stationary contacts 25 arranged to be connected by a moving bridge member 26, which is positioned by a bellows 27 in accordance with fluid pressure in the supply conduit 8. This pressure switch 24 is so designed that the circuit through the contacts 25 will be closed whenever there is fluid fuel under pressure in the supply conduit 8. The pressure switch 24 is of course connected by a lead 28 to the other pole of the electrical supply.

The operation of this purging arrangement is as follows. Assume first that the pump 10 represents a pipe-line compressor, so that there is always fluid pressure in the conduits 11, 12 regardless of whether the plant 1 is operating. This of course means that there will always be fluid pressure in the supply conduit 8 to maintain the pressure switch 24 in the closed position. This in turn means that the purging blower motor 20 will be energized and the solenoid valve 18 opened whenever the manual throttle handle 16a is moved to the off position so as to bridge the contacts 23. Thus when the powerplant is shut down by moving the throttle to the off position, the solenoid valve 18 will open and the scavenging blower 19 will withdraw any fluid fuel remaining in the supply conduit 8 at the downstream side of the control valves 15, 16. Since the fuel supply nozzles 5 in the powerplant have a constantly open orifice, the operation of the blower 19 will suck air, or any air-fuel mixture remaining in the combustors 3, through the nozzles and discharge such potentially explosive mixture through the conduit 21 to the roof of the powerplant housing. This purging action will continue as long as the powerplant remains shut down and fuel pressure is maintained in the supply conduit 8. Thus during shut-down, a small amount of pure air will be drawn in through the exhaust casing 4a and compressor inlet 2a, the turbine 4, the combustors 3, and the fuel supply lines 6, 8. This reverse flow of air from the atmosphere will positively assure that all traces of unburned fuel vapor are eliminated from the machine.

If on the other hand pump 10 is considered to represent only a small pump for supplying fuel to the powerplant, then the operation is as follows. When the plant is inoperative, the pump 10 is of course stationary and there is no fluid pressure in the supply line 8. This means that the pressure switch 24 is in the open condition, so that the solenoid valve and purging blower will not be actuated. To start the plant, the starter motor 9 will be energized and the turbine-compressor rotor brought up to the "firing speed." In accordance with common practice, the rotor may be turned over by the starting motor for a period of several minutes, so that the compressor 2 will pump fresh air from the atmosphere through the combustors 3 and exhaust casing to further insure that there will be no explosive mixture present anywhere in the system. Meanwhile, the rotation of the pump 10 has caused the fuel pressure to build up in the supply conduit 8, with the result that pressure switch 24 closes and the purging blower motor 20 and solenoid valve 18 are energized, since the throttle 16a is still in the off position. Operation of the blower 19 now insures that there will be no residual fuel in the supply conduit 8. Now to fire the plant, the throttle lever 16a is moved away from the off position, which breaks the circuit through the contacts 23, causing the solenoid valve 18 to close and the purging blower 19 to stop. The valve 18 of course insures that no usable fuel will be lost through the scavenge conduit 17. Fuel is now supplied through conduit 8 to the nozzles 5 and the resulting combustible mixture in the combustors 3 is ignited by any suitable means, for instance one or more conventional spark plugs, not shown.

It will be apparent from the above description that the system described prevents loss of useful fuel through the purging system during normal operation, but automatically effects the purging process whenever fuel pressure is applied to the control valves 15, 16 during inactive periods when the throttle valve lever is in its off position. Thus the invention safely disposes of any accumulations of combustible gases which might produce "hot starts" or introduce danger of a serious explosion during starting or when the powerplant is disassembled for inspection or repair.

It is to be understood that the drawing gives only a diagrammatic representation of a purging system in accordance with the invention; and it will be appreciated by those skilled in the art that many equivalent components may be substituted for those shown. For instance, the electrical control system shown for the purging components might be replaced by a system of pneumatic relays. Also, the throttle valve 16 will in actual practice usually not be a simple manually operated valve but one positioned by a complicated regulating mechanism having elements responsive to rotational speed, ambient pressure and temperature, turbine temperature, and other operating factors. The only requirement necessary in practicing the present invention is that the powerplant controlling mechanism include some sort of a purging system control device which is actuated when the machine is in the shut-down condition. It will be obvious that a centrifugal switch responsive to turbine-compressor shaft speed, or a pressure responsive switch actuated by the discharge pressure of the compressor 2 might also be employed. And in the case where the pump 10 is not a pipe-line compressor but only a fuel pump for the powerplant, the constant pressure regulating valve 14 and the strainer 13 may not be needed.

Many other changes and modifications will be apparent to those skilled in the art, and it is desired to cover by the appended claims all such changes as fall within the true spirit and scope of the invention.

What I claim as new and desire as Letters Patent in the United States is:

1. In a fuel supply system for a thermal powerplant having conduit means for supplying a fluid fuel under pressure with valve means for controlling the flow of fuel from the supply to the powerplant, the combination of purging means for removing residual fluids from the fuel system including a bleed conduit connected to the fuel supply conduit adjacent the downstream side of the control valve means, pump means for positively drawing fluids from the fuel conduit through said bleed conduit, and means for automatically actuating said pump when the powerplant is inactive and fuel under pressure is supplied to the up-stream side of the control valve means.

2. In a fuel supply system for a thermal powerplant having a motive fluid flow path communicating with the ambient atmosphere and conduit means for supplying a fluid fuel under pressure with valve means for controlling the flow of fuel from the supply to the powerplant, the powerplant including at least one combustor with a nozzle having a constantly open orifice for discharging fuel from the supply conduit into the combustion space of the combustor, the combination of purging means for removing residual fluids from the fuel and combustion system including a scavenge conduit connected to the fuel supply conduit adjacent the downstream side of the control valve means, pump means for positively withdrawing fluids from the fuel conduit through said scavenge conduit, and means for automatically actuating said pump when the powerplant is inactive and fuel under pressure is supplied to the up-stream side of the control valves whereby when the powerplant is shut down a small flow of air from the ambient atmosphere is induced into the combustion space and backward through the fuel supply system through said constantly open orifices of the fuel nozzles.

3. In a fuel supply system for a thermal powerplant having at least one combustor with a nozzle for introducing fluid fuel thereinto, fuel supply means including a conduit for supplying fluid fuel under pressure, and regulating mechanism for controlling the powerplant and including valve means for controlling the flow of fuel through said conduit to the nozzle, the combination of means for purging unburned fuel from the supply conduit and combustion system including a bleed conduit connected to the fuel supply conduit at the down-stream side of the fuel control valve, a motor driven pump for positively drawing fluid from the supply conduit through said bleed conduit, a shut-off valve in the bleed conduit, and means for automatically opening said shut-off valve and energizing the pump motor whenever the regulating mechanism is in the shut-down condition and fuel under pressure is supplied to the up-stream side of the regulating valve.

4. In a fuel supply system for a thermal powerplant having at least one combustor with a nozzle for introducing fluid fuel thereinto, fuel supply means including a conduit for supplying fluid fuel under pressure, and regulating mechanism for controlling the powerplant and including valve means for varying the flow of fuel through said conduit to the nozzle, the combination of means for scavenging unburned fuel from the supply conduit and combustion system including a bleed conduit connected to the fuel supply conduit between the fuel control valve and the nozzle, a scavenging pump for positively drawing fluid through said bleed conduit, an electric motor driving said pump, a solenoid operated shut-off valve in the bleed conduit, and means for automatically opening the shut-off valve and energizing the pump motor whenever the regulating mechanism is in the shut-down condition and fuel under pressure is supplied to the up-stream side of the regulating valve, said automatic means comprising a switch associated with the powerplant regulating mechanism and adapted to be open during normal operation of the powerplant and closed when in the shut-down condition, and other switch means in series with said first switch and including means responsive to pressure in the fuel supply conduit for closing the second switch whenever fuel pressure is applied to the upstream side of the fuel control valve means.

BRUCE O. BUCKLAND.

REFERENCES CITED

The following references are of record in the file of this patent:

UNITED STATES PATENTS

| Number | Name | Date |
|---|---|---|
| 1,359,176 | Kenworthy | Nov. 16, 1920 |
| 1,610,290 | Jones | Dec. 14, 1926 |